Figures 1, 2:
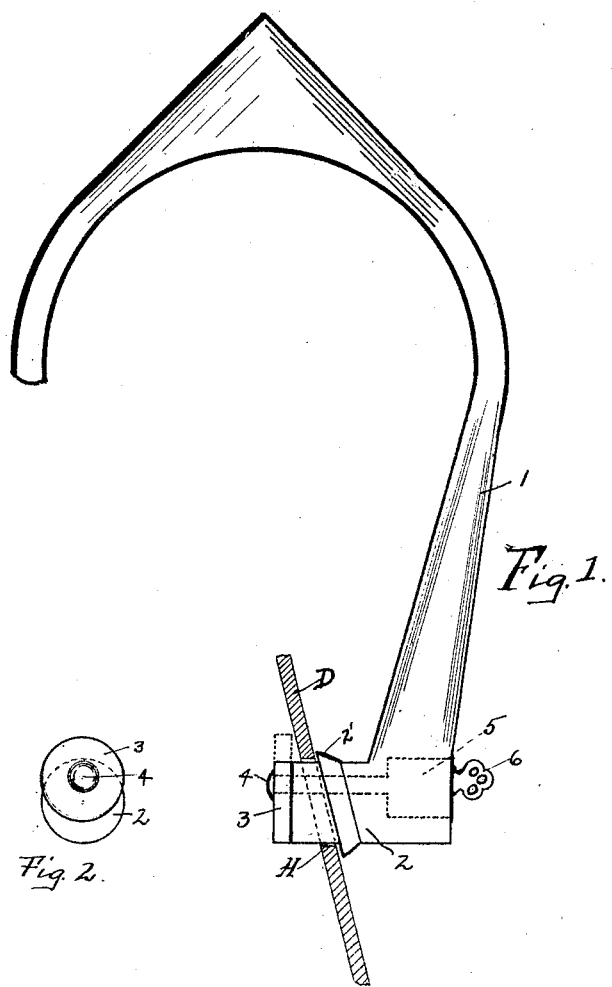

W. R. LITZENBERG.
AUTOMOBILE WHEEL CHOCK.
APPLICATION FILED JUNE 28, 1920.

1,367,514.

Patented Feb. 1, 1921.

William R. Litzenberg, INVENTOR.

UNITED STATES PATENT OFFICE.

WILLIAM R. LITZENBERG, OF PASADENA, CALIFORNIA, ASSIGNOR TO WALTER E. SMITH, OF LOS ANGELES, CALIFORNIA.

AUTOMOBILE-WHEEL CHOCK.

1,367,514.   Specification of Letters Patent.   Patented Feb. 1, 1921.

Application filed June 28, 1920. Serial No. 392,488.

*To all whom it may concern:*

Be it known that I, WILLIAM R. LITZENBERG, a citizen of the United States, residing in the city of Pasadena, county of Los Angeles, and State of California, have invented certain new and useful Improvements in Automobile-Wheel Chocks, of which the following is a specification.

My invention relates to automobile wheel chocks of the type shown and described in my Letters Patent No. 1,292,822, issued to me January 28, 1919, and has for its principal object to provide a wheel chock of the character referred to which can be used on what is known as the disk wheel, or a wheel having a solid body between its hub and its rim.

I have illustrated one practical embodiment of my invention in the accompanying sheet of drawings, in which Figure 1 is a side elevation of a wheel chock embodying my invention; and Fig. 2 is an end view, showing the latch or locking element turned into locking position.

Referring more in detail to the drawings, 1, designates the body of a wheel chock, of hook-like form, adapted to hook over the tire of a wheel. Said body has a cylindrical extension, 2, provided with an annular flange or guard or stop, 2', adapted to limit the distance the body, 2, can be inserted through a hole H in a disk D, representing the disk of a wheel constructed with a solid body from the hub to the rim. On the end of said body, 2, is mounted a locking element, here shown as a disk, 3, eccentrically mounted in said body 2, on a bolt 4, attached at its inner end to a lock mechanism, 5, adapted to be operated by a key, 6, whereby when said key is turned said locking disk, or latch, 3, is turned to an offset position, as indicated in dotted lines, Fig. 1, and in full lines in Fig. 2. When so turned, it is impossible to withdraw the body 2, from the hole, H, in the body of the wheel, as will be clear from the drawings. The stop or guard 2', protects the hole through the disk D, and prevents the insertion of any instrument through the hole for the purpose of interfering with the latch or locking element.

I am aware that many different kinds of latch elements can be provided on the end of the hook-like body of my invention for insertion through an opening in the wheel disk, and that other changes in the details can be made without departing from the spirit of my invention, and I do not, therefore, limit my invention to the details and arrangements shown, except as I may be limited by the hereto appended claims.

What I claim is:

1. In combination with a wheel having a solid portion between its hub and its rim and an opening therethrough, a wheel chock having a hook-like body adapted to hook over the rim of the wheel and having an extension adapted to be inserted through said hole, and locking means on the end of said extension adapted to lock to the inside of said solid portion of said wheel.

2. In combination with a wheel having a disk or solid body portion between its hub and rim with an opening therethrough, a wheel chock of hook-like form adapted to hook over the rim of the wheel and having an extension at its other end adapted to be inserted through the hole in said disk, and key-actuated locking means on the inner end of said extension adapted to be extended so as to be locked against being withdrawn from said hole.

3. In combination with a disk wheel having a hole through the disk thereof, a wheel chock adapted to hook over the tire of the wheel and provided with key-actuated locking means adapted to be inserted through said hole and locked against withdrawal from said disk, substantially as described.

4. In combination with a disk wheel having a hole therethrough, a wheel chock adapted to fit around the tire of said wheel and having locking means adapted to be inserted through the hole in said disk and to be locked against withdrawal from said hole, and a guard positioned to guard said hole.

5. In combination with a disk wheel having a hole therethrough, a wheel chock adapted to hook over the tire of said wheel and extending alongside of the disk portion of said wheel and having an extension adapted to be inserted through the hole in the disk, locking means on the inner end of said extension adapted to be turned to lock said chock to said wheel, and means for actuating said locking means, substantially as described.

6. In combination with a disk wheel having a hole therethrough, a wheel chock adapted to hook over the tire of said wheel and extending alongside of the disk portion of said wheel and having an extension adapted to be inserted through the hole in the disk and having a guard adapted to be positioned on the outside of said hole, locking means on the inner end of said extension adapted to be turned to lock said chock to said wheel, and means for actuating said locking means, substantially as described.

Signed at Los Angeles, Los Angeles county, California, this 10th day of April, 1920.

WILLIAM R. LITZENBERG.

In presence of—
D. O. FAWCETT,
HELEN FLETCHER.